(12) United States Patent
Yue

(10) Patent No.: US 9,894,235 B2
(45) Date of Patent: Feb. 13, 2018

(54) AUTO DOCUMENT FEEDER TO FINISHER PATH

(71) Applicant: KYOCERA Document Solutions Inc., Concord, CA (US)

(72) Inventor: Tommy Yue, Concord, CA (US)

(73) Assignee: Kyocera Document Solution Inc., Osaka (JP)

( * ) Notice: Subject to any disclaimer, the term of this patent is extended or adjusted under 35 U.S.C. 154(b) by 0 days.

(21) Appl. No.: 15/087,655

(22) Filed: Mar. 31, 2016

(65) Prior Publication Data
US 2017/0289387 A1   Oct. 5, 2017

(51) Int. Cl.
| | |
|---|---|
| H04N 1/04 | (2006.01) |
| H04N 1/12 | (2006.01) |
| B65H 5/00 | (2006.01) |
| B65H 37/04 | (2006.01) |
| B65H 29/58 | (2006.01) |
| B65H 15/00 | (2006.01) |
| B65H 43/06 | (2006.01) |
| H04N 1/00 | (2006.01) |

(52) U.S. Cl.
CPC ............ *H04N 1/1215* (2013.01); *B65H 5/00* (2013.01); *B65H 15/00* (2013.01); *B65H 29/58* (2013.01); *B65H 37/04* (2013.01); *B65H 43/06* (2013.01); *H04N 1/00602* (2013.01); *B65H 2801/39* (2013.01); *H04N 2201/0094* (2013.01); *H04N 2201/04* (2013.01)

(58) Field of Classification Search
CPC ............ H04N 1/1215; H04N 1/00602; H04N 2201/0094; H04N 2201/04; B65H 5/00; B65H 15/00; B65H 29/58; B65H 37/04; B65H 43/06; B65H 2801/39
See application file for complete search history.

(56) References Cited

U.S. PATENT DOCUMENTS

| | | | | |
|---|---|---|---|---|
| 5,496,019 | A | * 3/1996 | Yonovich | G03G 15/234 271/288 |
| 2013/0001050 | A1* | 1/2013 | Oshiro | G03G 21/00 198/780 |
| 2013/0293934 | A1* | 11/2013 | Shinto | H04N 1/00575 358/461 |
| 2013/0293936 | A1* | 11/2013 | Arakawa | H04N 1/121 358/498 |

* cited by examiner

*Primary Examiner* — Cheuckfan Lee
(74) *Attorney, Agent, or Firm* — West & Associates, A PC; Stuart J. West; Theodore A. Marsh

(57) ABSTRACT

A multifunctional printer comprising a printer section, an auto-document feeder, a scanner section, and a finisher, wherein a finisher path leads from the auto-document feeder into the printer section and converges with a print path into a shared finisher path leading to the finisher, such that documents scanned with the auto-document feeder can be conveyed to the finisher such that it can perform a finishing operation on the documents.

19 Claims, 17 Drawing Sheets

AUTO DOCUMENT FEEDER TO FINISHER PATH

BACKGROUND

Field of the Invention

The present disclosure relates to multifunctional printers (MFPs), particularly an MFP with a paper path conveying paper from an auto document feeder to a finisher output tray.

Background

Multifunctional printers (MFPs) that combine printing, scanning, and copying capabilities are often used in offices and other environments. Many MFPs include auto document feeders (ADF) that can feed sheets of paper from an input tray through the ADF to be scanned, and then output the sheets of paper to an output tray at the ADF. Such ADFs can quickly allow a stack of paper to be scanned individually and be reassembled in order at the ADF's output tray.

In many situations users wish to scan a stack of paper that has been stapled. To do so, most MFPs require users to first removing existing staples from the stack, and then scan the unstapled stack with the ADF. After scanning, the user can remove the scanned stack from the ADF's output tray and re-staple the stack manually. Manually stapling a stack of scanned paper can be annoying and/or time consuming for users.

Many MFPs have finisher units that can process stacks of paper that have been printed by the MFP. Some finisher units incorporate printers that can staple stacks of printed paper. However, the finisher unit's stapler is generally located proximate to a print output tray, relatively far away from the ADF's output tray. As such, the finisher unit's stapler cannot be used to automatically staple a stack of scanned paper that has passed through the ADF.

Some MFPs have been developed that have a stapler at the ADF output tray, such that stacks of scanned paper at the ADF output tray can be automatically stapled. However, when the MFP also has a stapler at its finishing unit for printed paper, this solution can lead to an inefficient duplication of parts and require users to restock staples at two different staplers within the same MFP.

What is needed is an MFP that can route paper from the ADF input tray through the MFP to a shared finisher unit that is configured to staple paper scanned by the MFP via the ADF in addition to paper that has been printed by the MFP.

SUMMARY

The present disclosure provides a multifunctional printer comprising a printer section comprising one or more printer components and a paper storage area, an auto-document feeder comprising an input tray and an input path configured to draw paper from the input tray into the input path, a scanner section comprising one or more image sensors configured to scan paper moving through the input path in the auto-document feeder, and a finisher comprising a stapler an a finisher output tray. The input path in the auto-document feeder can branch into an output path that leads to an output tray at the auto-document feeder and a finisher path that leads through the auto-document feeder, the scanner section, and the printer section. A path guide at the auto-document feeder can selectively close off either the output path or the finisher path. The finisher path and the print path can converge into a shared finisher path that leads through the printer section to the stapler in the finisher, such that the stapler can staple a stack of paper received through the shared finisher path. The stapled stack of paper can be output at the finisher output tray.

The present disclosure provides a method of selectively outputting scanned pages at a finisher of a multifunctional printer. The method comprises accepting instructions through a user interface to scan pages loaded at an input tray of an auto-document feeder, and sequentially drawing in pages from the input tray into an input path of the auto-document feeder and scanning the pages with an image sensor in a scanner section of the multifunctional printer. A path guide in the auto-document feeder can be selectively moved to close an output path branching from the input path to an output tray at the auto-document feeder, and correspondingly open a finisher path branching from the input path when the instructions indicate that a finisher mode including stapling options has been selected. The finisher path can lead through the scanner section and a printer section, and converge with a print path into a shared finisher path terminating at a finisher. Pages from the auto-document feeder's input tray can be conveyed through the finisher path and the shared finisher path to a stapler at the finisher, such that a stack of pages received at the finisher through the shared finisher path can be stapled with the stapler. A stack of stapled pages can be output at a finisher output tray.

DETAILED DESCRIPTION

Figure 1A:
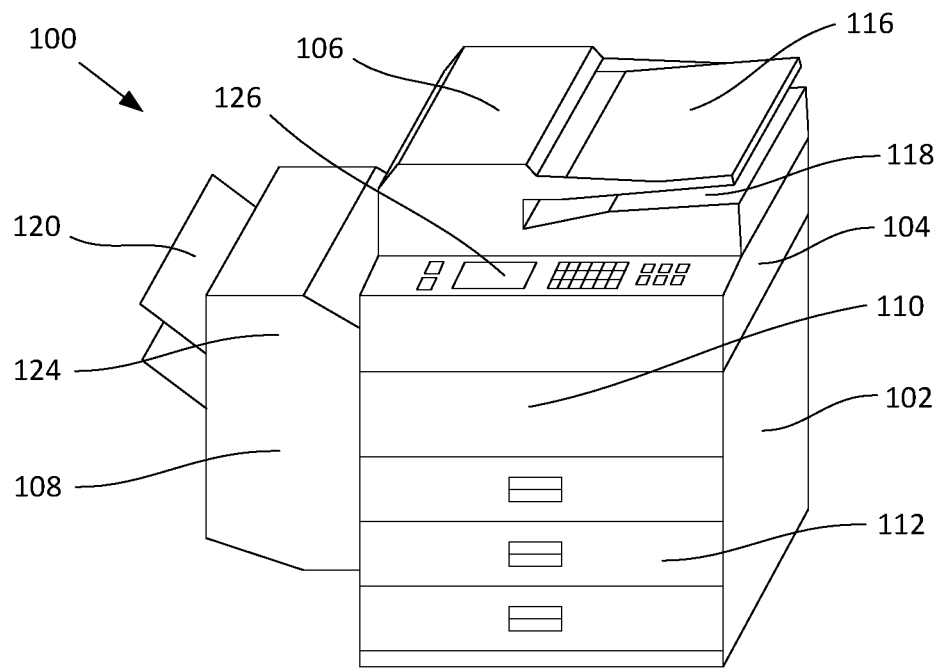
FIG. 1A depicts an exemplary embodiment of a multifunctional printer (MFP) with a closed lid.
Figure 1B:
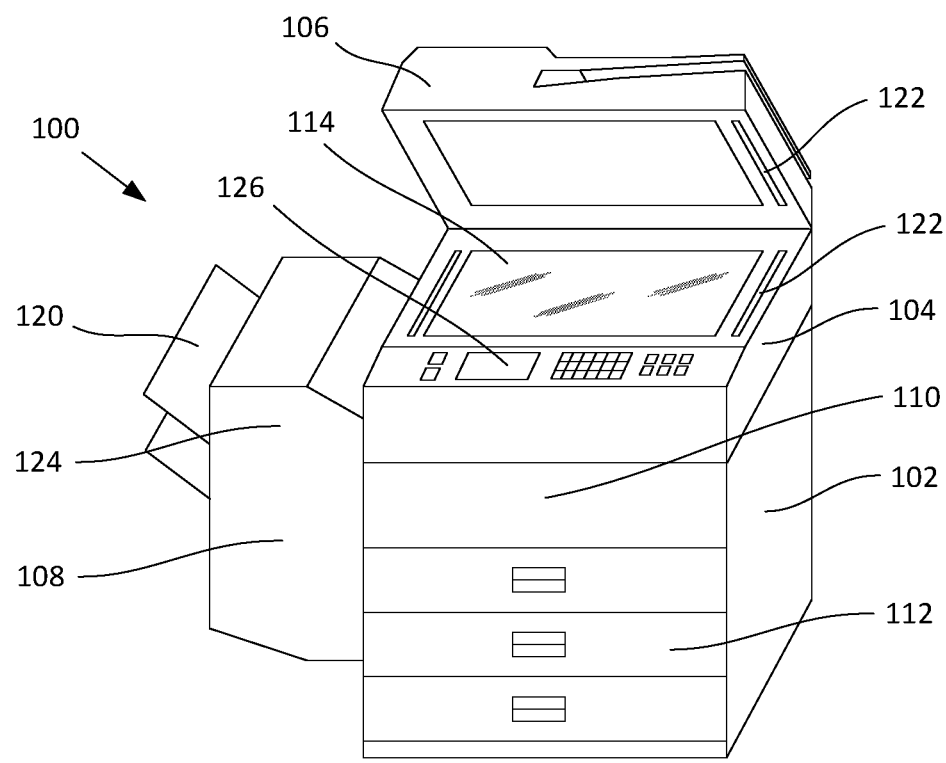
FIG. 1B depicts an exemplary embodiment of an MFP with an open lid.

FIGS. 1A-1B depict an exemplary embodiment of a multifunctional printer (MFP) 100, also known as a "multifunctional product" or "multifunctional system." An MFP 100 can be "all-in-one" machine that has a plurality of different functions such as printing, copying, scanning, faxing, and/or other functions. The MFP 100 can comprise a printer section 102, a scanner section 104, an auto document feeder (ADF) 106, and a finisher 108.

The printer section 102 can comprise printer components 110 configured to print color and/or monochrome text and images on paper that passes through the printer section 102. In some embodiments, the printer section 102 can comprise laser printer components, such as laser diodes, lenses, mirrors, photoconductor drums, toner hoppers, charge rolls, fusers, and/or other components. In other embodiments, the printer section 102 can comprise inkjet printer components, such as print heads and ink cartridges. In still other embodiments, the printer section can comprise components of any other desired type of color or monochrome printer. The MFP 100 can comprise one or more paper storage areas 112, such as drawers or trays, from which it can draw pieces of paper to be printed on by the printer components 110.

The scanner section 104 can comprise a platen 114 and one or more image sensors configured to scan documents placed on the platen 114 or that pass through the auto document feeder 106. The platen 114 can be a transparent planar member, such as a sheet of glass or transparent plastic, through which the image sensors can view documents positioned above the platen 114. The MFP 100 can be configured to store digital representations of scanned documents in memory. In some embodiments the image sensors can be contact image sensors (CIS). In other embodiments the image sensors can be charge coupled devices (CCD) or image sensors of any other type.

The ADF 106 can comprise an ADF input tray 116 configured to accept one or more pieces of paper, such as a stack of paper. The ADF 106 can also comprise an ADF output tray 118 configured to store one or more pieces of paper that have been scanned by the scanner section 104 and output by the ADF 106. In some embodiments the ADF 106 can be mounted on a hinged lid above the scanner section 104, such that the lid can be closed to cover the scanner section's platen 112 as shown in FIG. 1A, or opened to expose the platen 112 as shown in FIG. 1B.

As will be discussed further below, the ADF 106 can be configured to sequentially move sheets of paper from the ADF input tray 116 through the ADF 106 such that they can be scanned by the scanner section's image sensors, and be routed to either the ADF output tray 118 or a finisher output tray 120. When paper is routed through the ADF 106 to the finisher output tray 120 instead of the ADF output tray 118, the paper can pass through a paper path cutout 122 in the lower surface of the ADF 106 into an adjacent paper path cutout 122 in the upper surface of the scanner section 104. In some embodiments, there can also be one or more openings on the bottom surface of the ADF 106 such that paper moving through the ADF 106 can be scanned by the image sensors through the platen 106 as the paper moves past the openings in the ADF 106.

In some embodiments, the finisher 108 can be a removable component that can be selectively coupled to the printer section 102. In other embodiments, the finisher 108 can be permanently coupled to the printer section 102. The finisher 108 can comprise a finisher output tray 120 configured to store one or more pieces of printed and/or scanned paper until the paper is removed by a user.

The finisher 108 can comprise a stapler 124 configured to staple stacks of printed and/or scanned paper located at the finisher 108. In some embodiments the stapler 124 can staple a stack of printed and/or scanned paper that is resting in the finisher output tray 120. In other embodiments the stapler 124 can staple a stack of printed and/or scanned paper inside the finisher 108 before it is conveyed to the finisher output tray 120. In some embodiments, the stapler 124 can be loaded with multiple types of staples, such that a user can select which type of staple to use, and/or can be set to staple at one or more positions on paper received at the finisher 108. In other embodiments the stapler 124 can have a single type of staple and/or a preset stapling location.

In some embodiments the finisher 108 can further comprise one or more other components configured to perform selected actions on printed and/or scanned paper, such as hole punching, folding, and/or collating.

The MFP 100 can additionally comprise input/output devices 126. The input/output devices 126 can be screens, buttons, keyboards, switches, dials, indicator lights, speakers, and/or any other type of input or output device. By way of a non-limiting example, an input/output device 126 can be a liquid-crystal display (LCD) screen mounted on the exterior of the MFP 100, such as at a position adjacent to the platen 114. In some embodiments, screens can be touch-sensitive. In other embodiments, users can interact with a user interface displayed on a screen using other controls such as buttons or keyboards.

Figure 2:
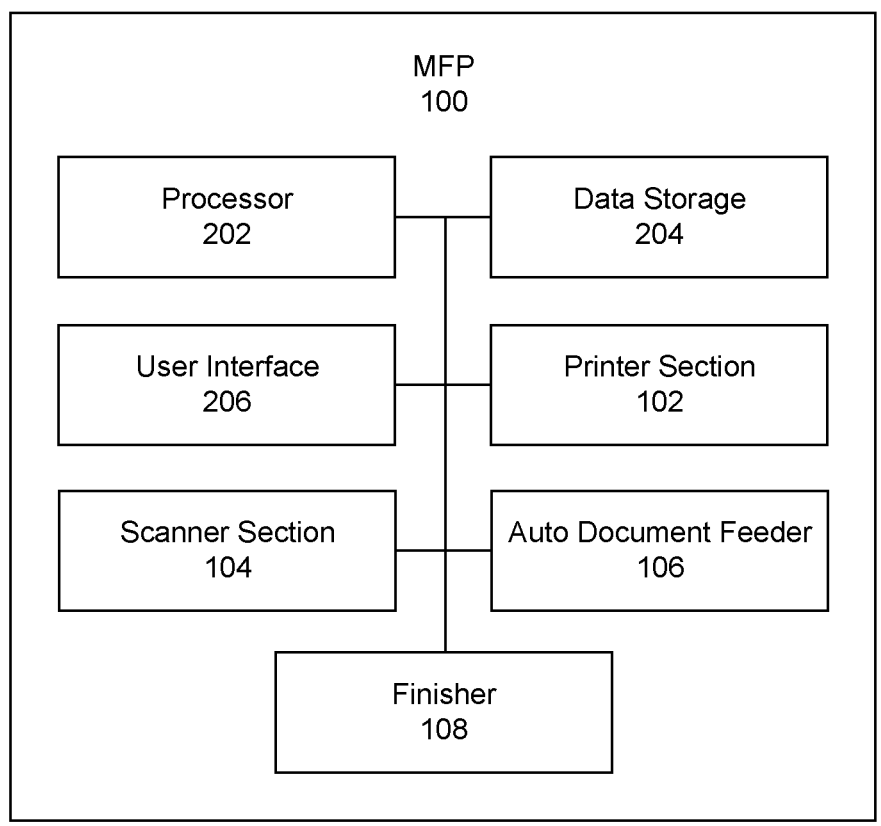
FIG. 2 depicts an embodiment of an MFP's internal components.

As shown in FIG. 2, an MFP 100 can further comprise a processor 202, data storage 204, and a user interface 206 that can direct and/or assist in the operations other MFP components such as the printer section 102, scanner section 104, ADF 106, and/or finisher 108.

The processor 202 can be a chip, circuit or controller configured to execute instructions to direct the operations of the MFP 100, such as a central processing unit (CPU), application-specific integrated circuit (ASIC), field-programmable gate array (FPGA), graphics processing unit (GPU), or any other chip, circuit, or controller. In some embodiments a plurality of chips, circuits, and/or controllers can operate together to direct the operations of the MFP 100.

Data storage 204 can be one or more internal and/or external digital storage devices, such as random access memory (RAM), read-only memory (ROM), electrically erasable programmable read-only memory (EEPROM), flash memory, digital tape, a hard disk drive HDD), a solid state drive (SSD), any/or any other type of volatile or non-volatile digital memory. The data storage 204 can store instructions executable by the processor 202 to operate the MFP 100, including an operating system and/or applications.

The user interface 206 can comprise hardware and/or software elements for receiving instructions from users and/or displaying information to users. In some embodiments the user interface 206 can comprise graphical user interfaces and/or other interfaces operable by users through input/output devices 126. In other embodiments the MFP 100 can alternately or additionally comprise one or more data communication interfaces through which the MFP 100 can connect to separate client devices to receive instructions and/or output information. By way of non-limiting examples, the MFP can have a network and/or IP connection interfaces or peer-to-peer connection interfaces for directly communicating with client devices, such as interfaces using near-field communication, Bluetooth, or Wi-Fi Direct. In these embodiments, a user can connect a client device, such as a mobile phone, computer, tablet, or any other device, to the MFP 100 to interact with the MFP's user interface 206 via the client device.

In some embodiments the MFP 100 can further comprise fax components for faxing scanned documents, network components for transmitting data over the internet or any other data network, and/or ports for connecting to other devices, such as USB and Ethernet ports. In some embodiments the printer section 102 and the scanner section 104 can work together in a copy function to scan documents on the platen 114 using the scanner section 104 and then print them using the printer section 102.

In some embodiments, the MFP 100 can further comprise one or more sensors and/or page counters, such as optical sensors or scan counters, such that it can track the number of pages that have been fed into the ADF 106, scanned by the image sensors, and/or received at the finisher 108.

Figure 3A:
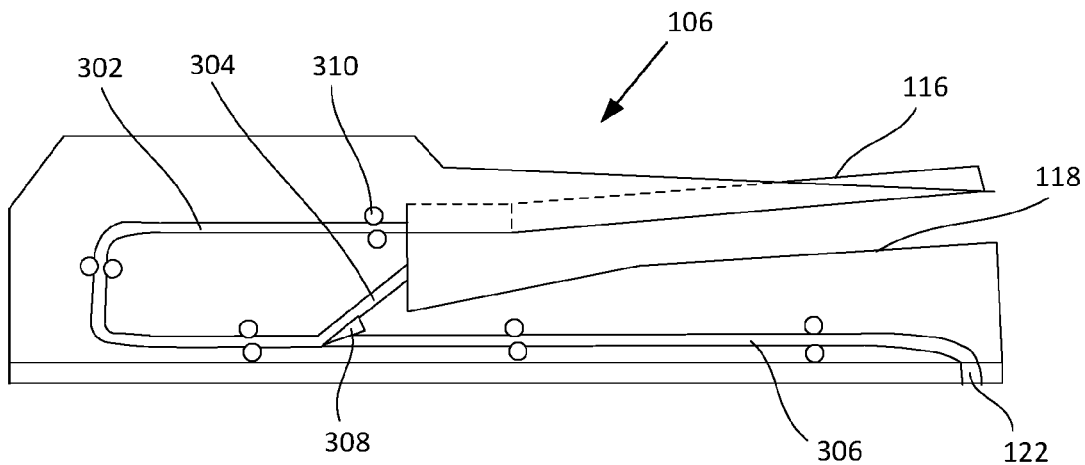
FIG. 3A depicts a cross section of an exemplary embodiment of an auto document feeder (ADF).
Figure 3B:
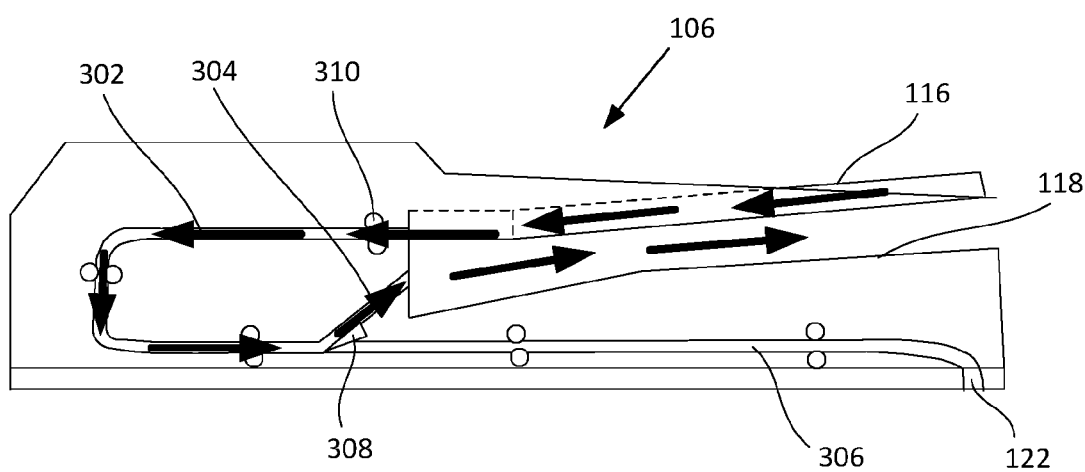
FIG. 3B depicts paper routed through an exemplary embodiment of an ADF into an ADF output path that discharges paper at an ADF output tray.
Figure 3C:
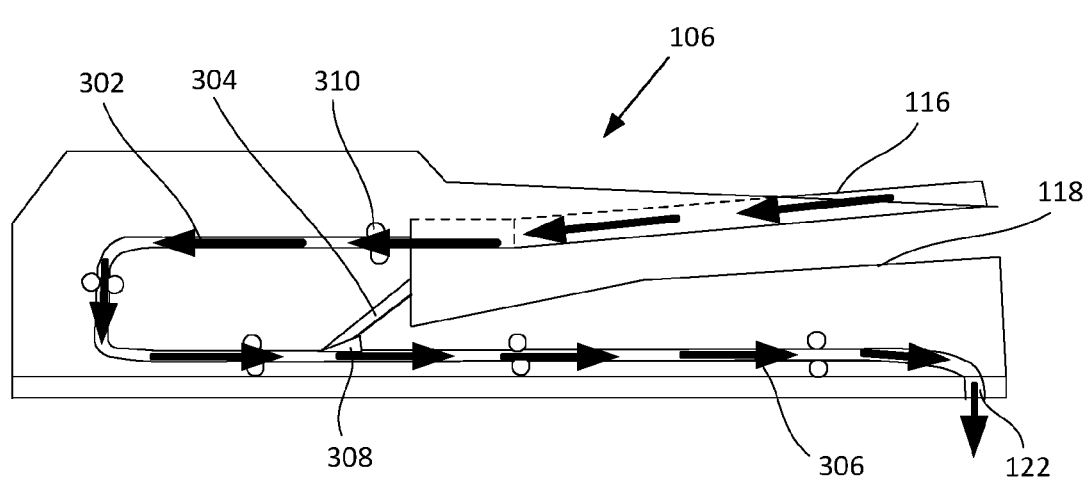
FIG. 3C depicts paper routed through an exemplary embodiment of an ADF into an ADF finisher path leading toward a finisher.

FIGS. 3A-3C depict cross-sections of an embodiment of an ADF 106. An ADF 106 can comprise an ADF input path 302 that branches into an ADF output path 304 and an ADF finisher path 306. The ADF input path 302, the ADF output path 304, and the ADF finisher path 306 can be pathways through which sheets of paper can move. As such, they can be at least as wide and as deep as a sheet of paper of a predefined size and/or type. By way of a non-limiting example, an MFP 100 configured to scan sheets of 8.5 inch by 11 inch paper can have paper paths at least 8.5 inches wide. The ADF 106 can further comprise one or more mechanized rollers 310, pullers, arms, or other conveyance mechanisms that can pull, push, or otherwise move a sheet of paper through the paper paths as will be described below.

The ADF 106 can also comprise an ADF path guide 308 at the point at which the ADF input path 302 branches into the ADF output path 304 and the ADF finisher path 306. The ADF path guide 308 can be a mechanized component that can be moved to selectively close off either one of the ADF output path 304 and the ADF finisher path 306 from the ADF input path 302, as shown in FIGS. 3B and 3C.

The ADF output path 304 can branch off the ADF input path 302 and end at the ADF output tray 118. As shown in FIG. 3B, paper routed by the ADF path guide 308 into the ADF output path 304 can exit the ADF output path 304 and rest in the ADF output tray 118.

The ADF finisher path 306 can branch off the ADF input path 302 and continue on from the ADF 106 into the scanner section 104 and printer section 102 as will be described further below. As shown in FIG. 3C, paper exiting the ADF 106 via the ADF finisher path 306 can pass through the ADF's paper path cutout 122.

Figure 4A:
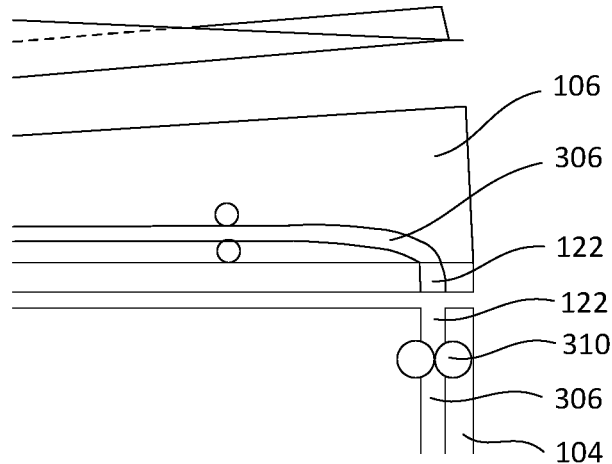
FIG. 4A depicts an embodiment of adjoining paper path cutouts in an ADF and a scanner section that are substantially similar in size.
Figure 4B:
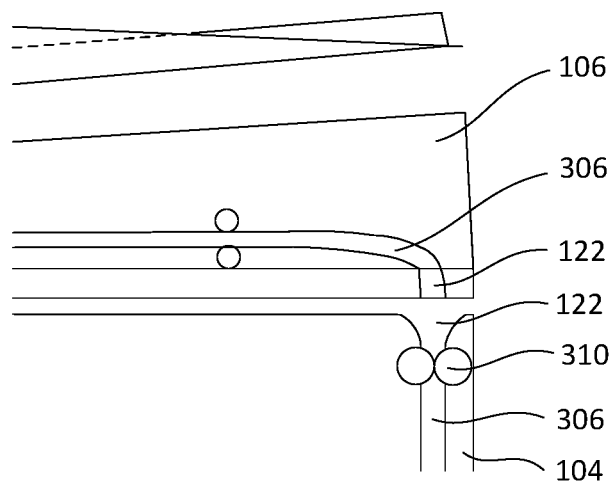
FIG. 4B depicts an embodiment of adjoining paper path cutouts in an ADF and a scanner section wherein the scanner section's paper path cutout is tapered.

FIGS. 4A and 4B depict close-up views of adjoining paper path cutouts 122 in the ADF 106 and scanner section 104. Paper exiting the ADF 106 through its paper path cutout 122 can enter a corresponding paper path cutout 122 in the scanner section 104 when the MFP's lid is closed and the paper path cutouts 122 are lined up. The paper path cutout 122 in the scanner section 104 can enter into a continuation of the ADF finisher path 306 that passes through the scanner section 104 and printer section 102. As with the ADF 106, the scanner section 104 and the printer section 102 can comprise mechanized rollers 310, pullers, arms, or other conveyance mechanisms positioned along its paper paths that can pull, push, or otherwise move a sheet of paper through their paper paths. In some embodiments the dimensions of the paper path cutout 122 in the scanner section 104 can be substantially similar to the dimensions of the rest of the ADF finisher path 306, as shown in FIG. 4A. In alternate embodiments the paper path cutout 122 in the scanner section 104 can be curved, tapered, sloped, or otherwise shaped to gradually guide paper exiting the ADF 106 into the ADF finisher path 306, as shown in FIG. 4B.

Figure 5A:
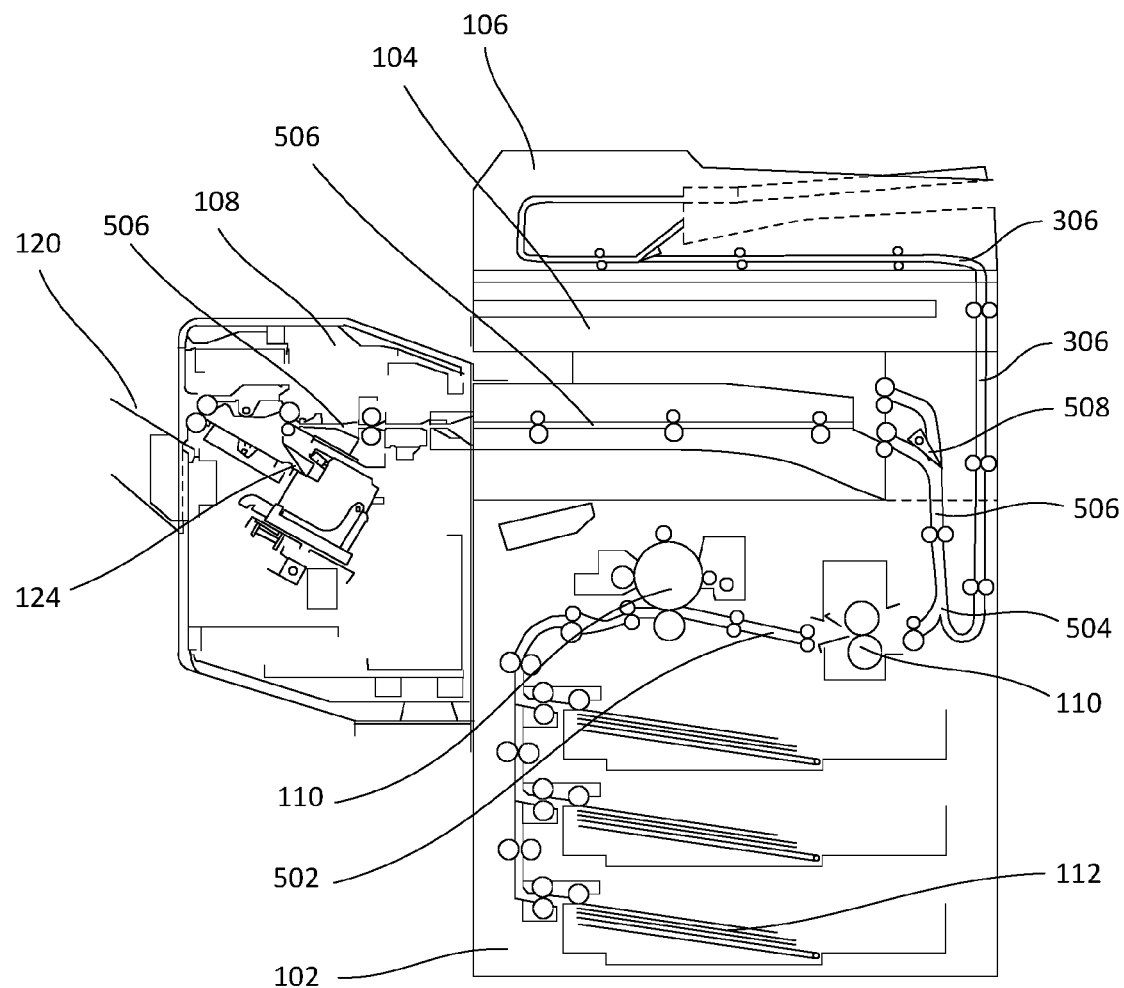
FIGS. 5A-5B depict a cross section of an embodiment of an MFP wherein the ADF finisher path joins with a print path at a post-print junction such that both feed into a shared finisher path.
Figure 5B:
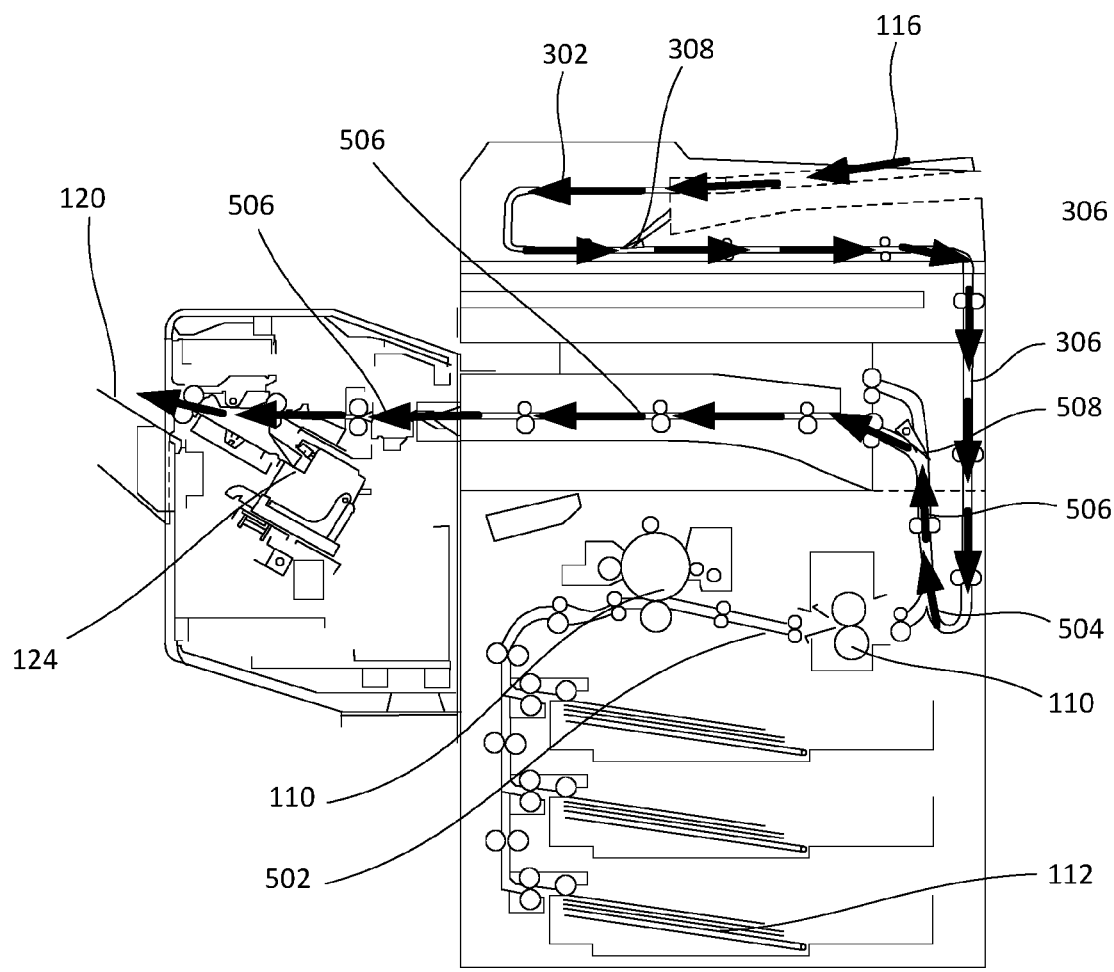

FIGS. 5A-5B depict a cross section of an embodiment of an MFP 100 wherein the ADF finisher path 306 joins with a print path 502 at a post-print junction 504 such that both the ADF finisher path 306 and the print path 502 feed into a shared finisher path 506.

The printer section 102 can comprise a print path 502 that conveys sheets of paper from paper storage areas 112 through printer components 110 inside the printer section 102. In some embodiments, a plurality of print paths 502 can join into a main print path 502, such that paper can be drawn from any of a plurality of different paper storage areas 112 into the main print path 502. The printer components 110 can be configured to print text and/or images on the sheets of paper as they are conveyed through the print path 502.

The post-print junction 504 between the ADF finisher path 306 and the print path 502 can be positioned such that paper passing through the ADF finisher path 306 is routed into the shared finisher path 506 without being routed through the printer components 110. The post-print junction 504 can be located at the print path 502 after the printer components 110, at a location such that paper passing through the print path 502 can be printed on by the printer components 110 before the paper reaches the post-print junction 504 and is routed into the shared finisher path 506.

The shared finisher path 506 can pass through the printer section 102 and/or scanner section 104 into the finisher 108. As with the ADF 106, the scanner section 104, and the printer section 102, the finisher 108 can comprise mechanized rollers 310, pullers, arms, or other conveyance mechanisms positioned along its paper paths that can pull, push, or otherwise move a sheet of paper through its paper paths. In some embodiments, the MFP can comprise one or more finisher path guides 508 at positions at which the shared finisher path 506 branches into one or more alternate paper paths leading to other destinations such as alternate output paper trays and duplex paths 604, as will be discussed further below. The finisher path guides 508 can be mechanized components that can be moved to selectively close off the alternate paper paths to keep paper in the shared finisher path and moving toward the finisher 108.

In some embodiments, the shared finisher path 506 can terminate at the finisher output tray 120, such that the finisher's stapler 124 can staple stacks of paper resting at the finisher output tray 120. In other embodiments, the shared finisher path 506 can terminate inside the finisher 108 at a position wherein the finisher's stapler 124 can staple a stack of paper that has exited the shared finisher path 506 before the stapled stack of paper is conveyed to the finisher output tray 120.

As shown in FIG. 5B, paper originating at the ADF input tray 116 can be drawn into the ADF input path 302 to be scanned. The scanned paper can be routed by the ADF path guide 308 into the ADF finisher path 306, where it can then flow into the shared finisher path 506 and be conveyed into the finisher 108. Stacks of paper that were scanned via the ADF 106 and routed into the finisher 108 through the ADF finisher path 306 and the shared finisher path 506 can be stapled with the stapler 124 and/or output at the finisher output tray 120. Similarly, paper from paper storage areas 112 can be drawn through the print path 502 such that they can be printed on by printer components 110. Printed paper passing through the print path 502 can be fed into the shared finisher path 506 to route it into the finisher 108, such that stacks of printed paper can be stapled by the stapler 124 and/or output at the finisher output tray 120. As such, the finisher's stapler 124 can staple both scanned paper originating at the ADF input tray 116 and printed paper originating at a paper storage area 112.

In some embodiments or situations, pages from the paper storage areas 112 can be drawn through the print paths 502 before, after, and/or between pages passing into the shared finisher path 506 from the ADF finisher path 306, such that pages from the paper storage areas 112 can be added to, or interspersed with, scanned pages when they reach the finisher 108. By way of a non-limiting example, white or colored paper from the paper storage areas 112 can be left blank or printed on with the printer components 110 to add cover pages or section breaks to a stack of scanned paper before the stack is stapled at the finisher 108. By way of another non-limiting example, colored paper from a paper storage area 112 can be inserted between separate stapled stacks of scanned paper at the finisher 108, such that a user can more easily separate the stapled stacks. In some embodiments, a user can use the user interface to specify that pages from the paper storage areas 112 should be added to, or interspersed with, scanned pages from the ADF 106, and/or whether text or images should be printed on pages from the paper storage areas 112.

Figure 6A:
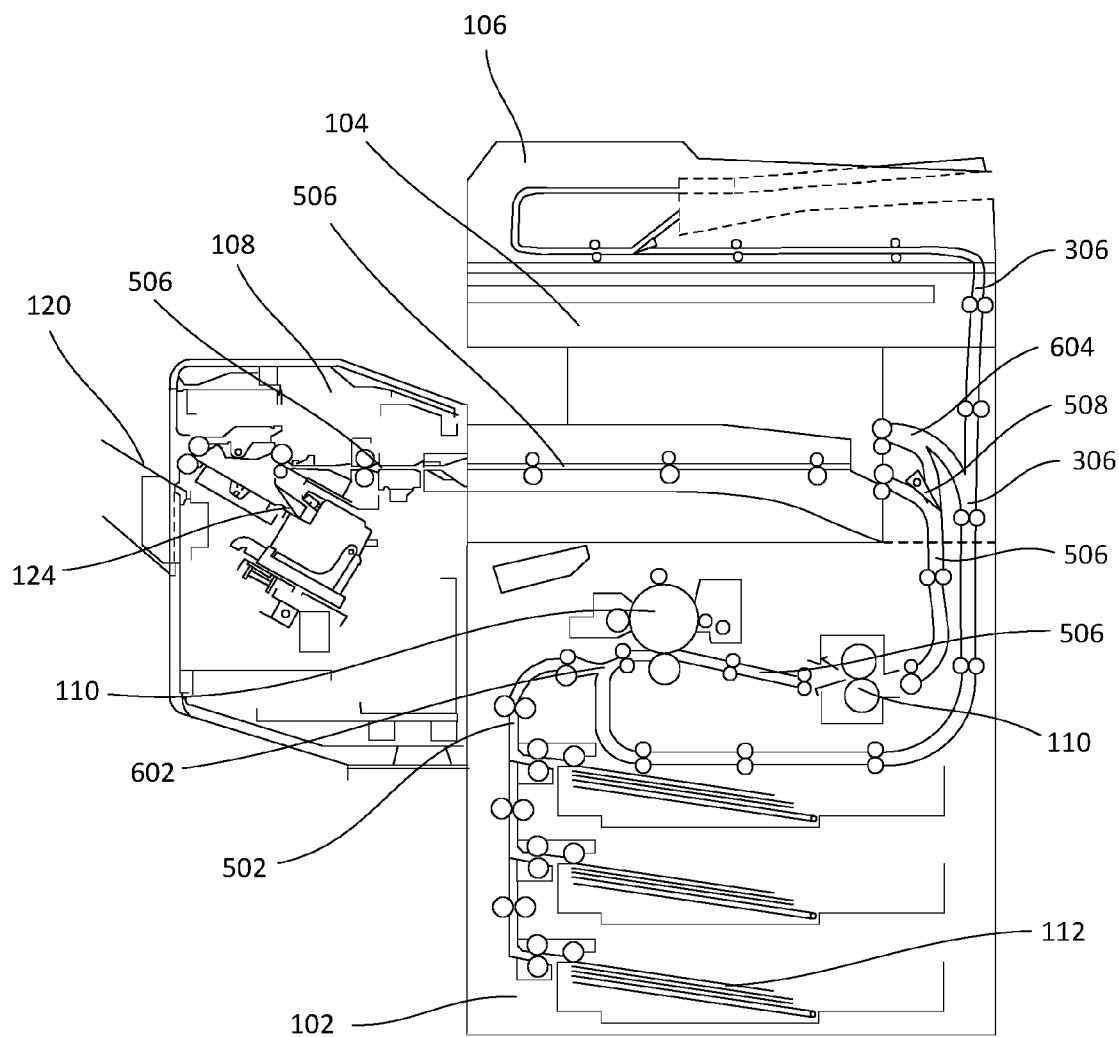
FIGS. 6A-6B depict a cross section of an embodiment of an MFP wherein the ADF finisher path joins with a print path at a pre-print junction such that both feed into a shared finisher path.
Figure 6B:
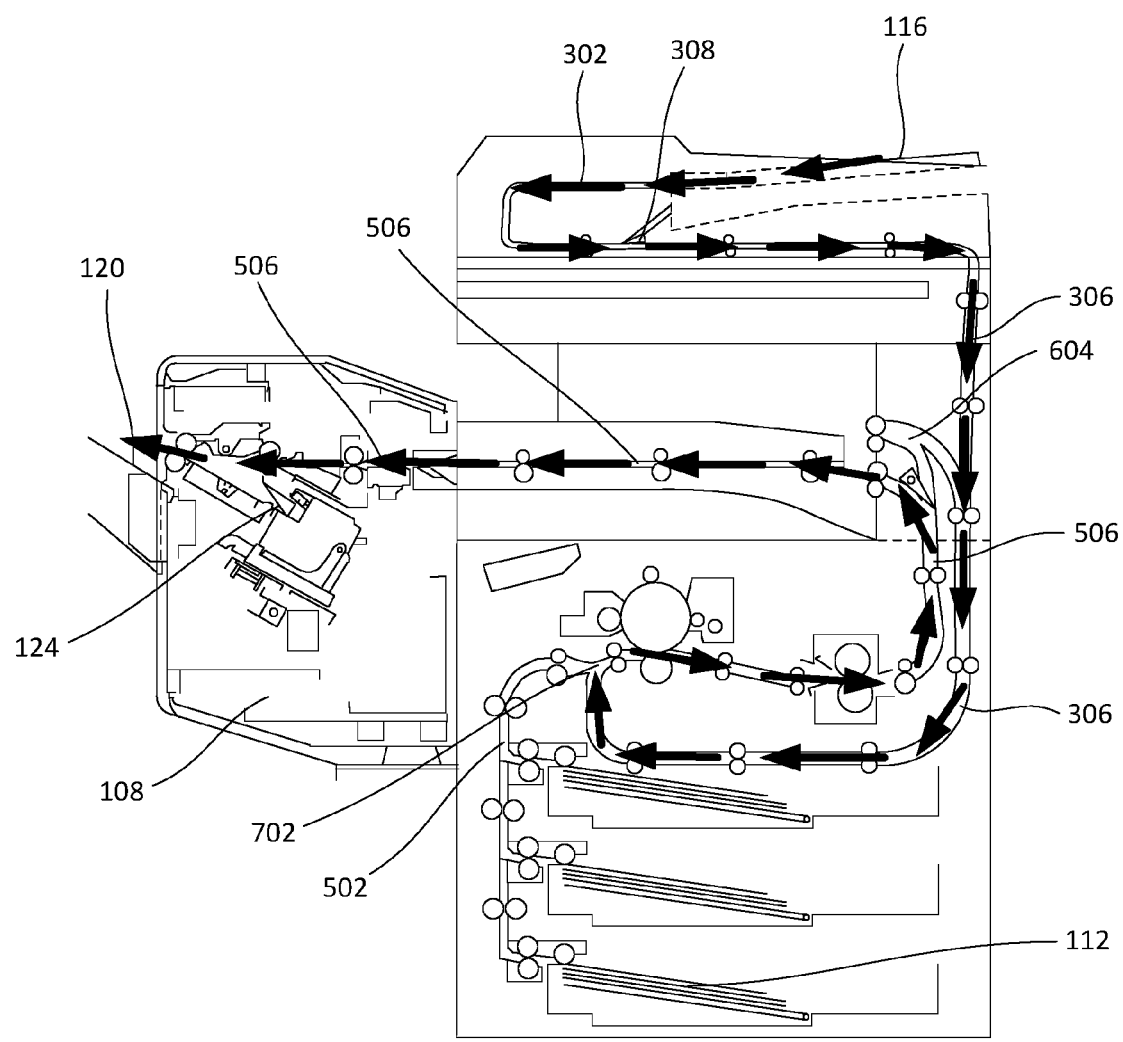

FIGS. 6A-6B depict a cross section of an alternate embodiment of an MFP 100 wherein the ADF finisher path 306 joins with a print path 502 at a pre-print junction 602 such that both the ADF finisher path 306 and the print path 502 feed into a shared finisher path 506.

In the embodiment shown in FIGS. 6A-6B, the shared finisher path 506 can pass through one or more printer components 110 such that paper passed into the shared finisher path 506 from both the print path 502 and the ADF finisher path 306 can be printed on with the printer components 110. The pre-print junction 602 can be located at a convergence point between the print path 502 and the ADF finisher path 306 before the printer components 110, at a location such that paper passing through either the print path 502 or the ADF finisher path 306 is routed into the shared finisher path 506 and then through the printer components 110. After passing through the printer components 110, the paper can continue along the shared finisher path 506 to the finisher 108, where it can be stapled with the finisher's stapler 124 and/or rest at the finisher output tray 120.

As shown in FIG. 6B, paper originating at the ADF input tray 116 can be drawn into the ADF input path 302 to be scanned. The scanned paper can be routed by the ADF path guide 308 into the ADF finisher path 306, where it can then flow into the shared finisher path 506 through the printer components 110 and be conveyed into the finisher 108. Stacks of paper that were scanned via the ADF 106 and routed into the finisher 108 through the ADF finisher path 306 and the shared finisher path 506 can be stapled with the stapler 124 and/or output at the finisher output tray 120. Similarly, paper from paper storage areas 112 can be drawn through the print path 502 into the shared finisher path 506 such that they can be printed on by printer components 110. Printed paper passing through the print path 502 can be routed through the shared finisher path 506 into the finisher 108, such that stacks of printed paper can be stapled by the stapler 124 and/or output at the finisher output tray 120. As such, the finisher's stapler 124 can staple both scanned paper originating at the ADF input tray 116 and printed paper originating at a paper storage area 112.

As described above, in this embodiment scanned pages from the ADF 106 can pass from the ADF finisher path 306 into the shared finisher path 506 at the pre-print junction 602 such that it is routed through the printer components 110. In some embodiments or situations the printer components 110 can be configured to avoid printing on scanned pages that originated at the ADF 106 as the scanned pages pass through the shared finisher path 506. However, in other embodiments or situations the printer components 110 can be configured to print images and/or text on scanned pages that originated at the ADF 106 as the scanned pages pass through the shared finisher path 506. By way of non-limiting examples, information can be printed on scanned pages, such as the word "SCANNED," a date, a page number, a Bates number, and/or any other desired information. In some embodiments, the user interface 206 can be configured to accept instructions from user regarding information to be printed on scanned pages, through either the MFP's own input/output devices 126 or via a connected client device.

In some embodiments, the MFP 100 can further comprise one or more duplex paths 604 that can selectively re-route pages to flip the pages to their opposite face as they pass through the MFP 100. By way of a non-limiting example, the MFP 100 can pass a page through the printer components 110 with a first face toward the printer components 110, then route the page into a duplex path 604 so that the page is flipped and its second face is toward the printer components 110 as it makes a second path through the printer components 110, thereby allowing double-sided printing. By way of another non-limiting example, a scanned page from the ADF 106 that has text on a single side of the page can pass through the printer components 110 a first time with its blank side toward the printer components 110, then be routed into a duplex path 604 such that it passes through the printer components 110 a second time with its printed side toward the printer components 110 so that the printer components 110 can print "SCANNED" or any other desired information on the same side of the page as the rest of its pre-existing text. A duplex path 604 can have rollers 310 or other mechanized components that can pull in a sheet of paper from one paper path, then reverse its direction of movement to convey the sheet of paper along an alternate paper path.

The embodiment shown in FIGS. 6A-6B comprises a duplex path 604 that branches off the shared finisher path 506. A finisher path guide 508 at the branching point can be closed or opened to direct sheets of paper to either continue along the shared finisher path 506 or into the duplex path 604.

Figure 7:
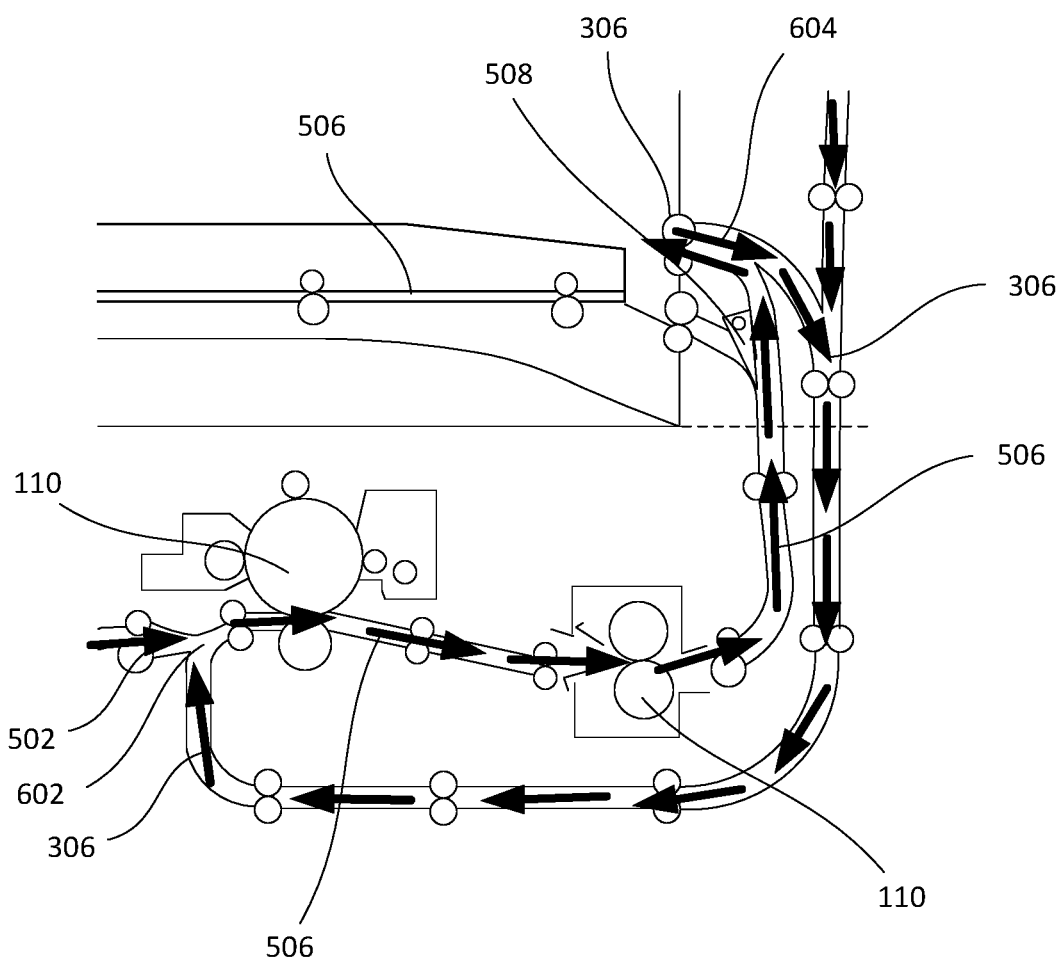
FIG. 7 depicts paper routed through a duplex path in the embodiment of FIGS. 6A-6B.

As shown in the close-up view of FIG. 7, the duplex path 604 in the embodiment of FIGS. 6A-6B can pull in a sheet of paper from the shared finisher path 506, and then reverse its direction of movement to convey the sheet of paper along the ADF finisher path 306. In some embodiments or situations, a single-sided scanned sheet of paper originating at the ADF 106 can first pass through the shared finisher path 506 with its blank side facing toward the printer components 110. The MFP 100 can then use one or more finisher path guides 508 to direct the sheet of paper into the duplex path 604, where the paper can be reversed and sent along the ADF finisher path 306 such that it can rejoin the shared finisher path 506 at the pre-print junction 602 in a flipped orientation with its printed side facing toward the printer components 110. The MFP 100 can print text and/or images on the printed side of the sheet using the printer components 110, and then use the finisher path guides 508 to direct the sheet of paper along the shared finisher path 506 to the stapler 124 and/or finisher output tray 120. Alternately, the duplex path 604 can be used to direct paper from the ADF 106 and/or the paper storage areas 112 through the printer components 110 such that the printer components 110 can print on either or both sides of the paper.

Figure 8A:
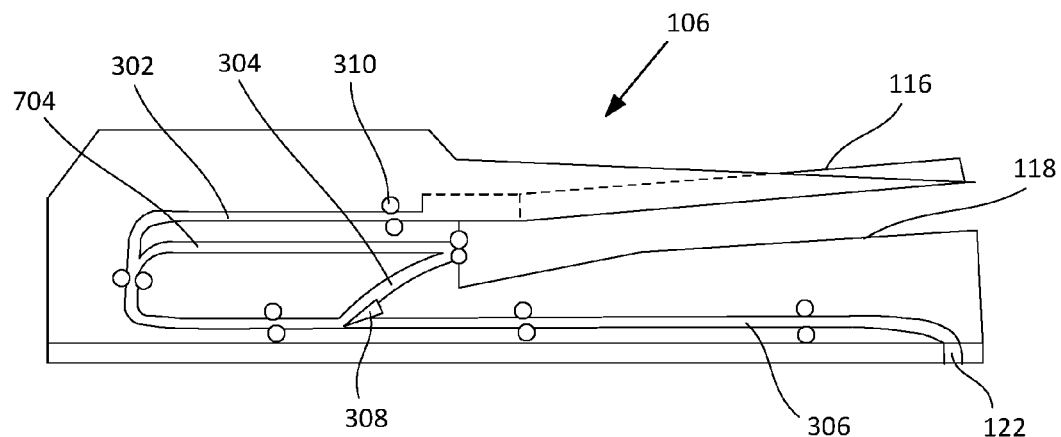
FIGS. 8A-8C depict an alternate embodiment of an ADF that comprises a duplex path.
Figure 8B:
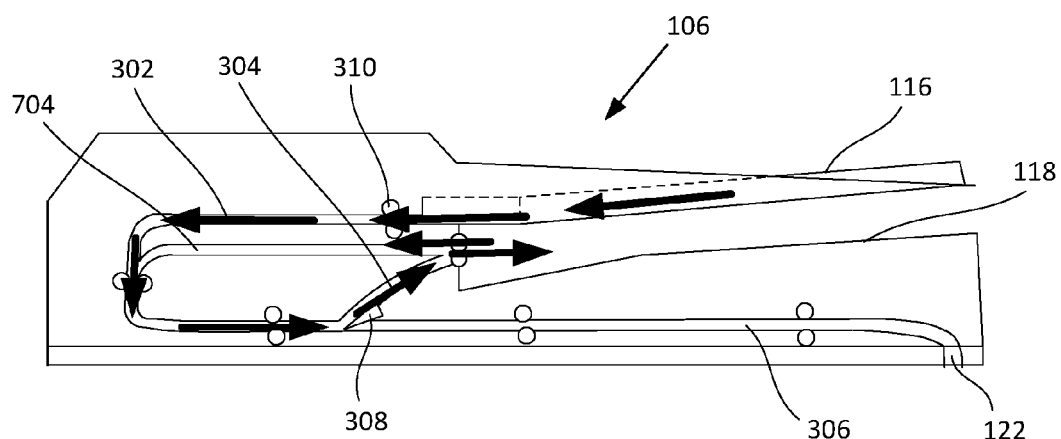
Figure 8C:
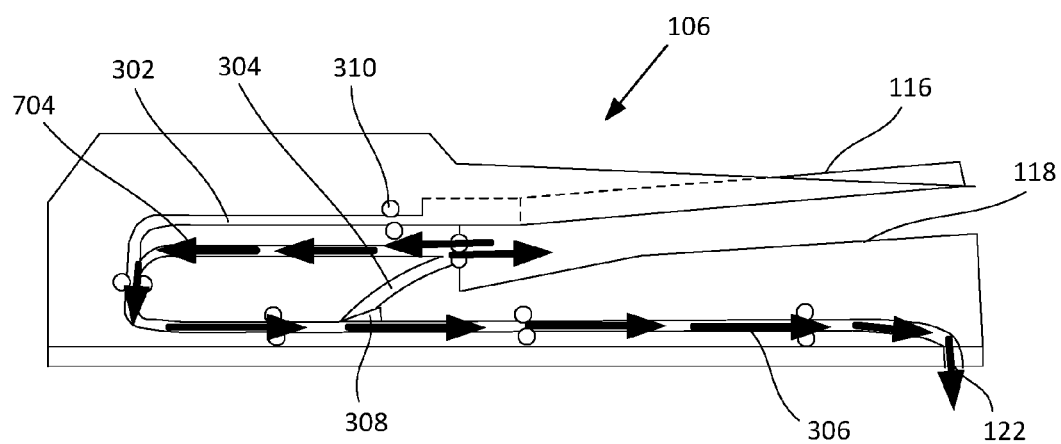

FIGS. 8A-8C depict an alternate embodiment of an ADF 106 that comprises a duplex path 604. In this embodiment, the duplex path 604 can connect the ADF output path 304 with the ADF input path 302, as shown in FIG. 8A. In use, paper can be drawn into the ADF input path 302 from the ADF input tray 116, be scanned at or near the bottom of the ADF 106, and then be routed into the ADF output path 304, as shown in FIG. 8B. The ADF 106 can reverse the direction of paper that would otherwise exit into the ADF output tray 118, and pull it into the duplex path 604 so that it is conveyed into the ADF input path 302 and ADF finisher path 306 as shown in FIG. 8C. As such, while a first side of the page can have been facing toward the scanner section 104 before it was routed into the ADF output path 304, the second side of the page can be facing toward the scanner section 104 after it passes through the duplex path 604 in the ADF 106. The duplex path 604 in the ADF 106 can thus allow one or both sides of the page to be scanned, and/or can flip a single-sided page so that its printed side faces the printer components 110 during a first pass through the shared finisher path 506 in embodiments comprising a pre-print junction 602.

Figure 9A:
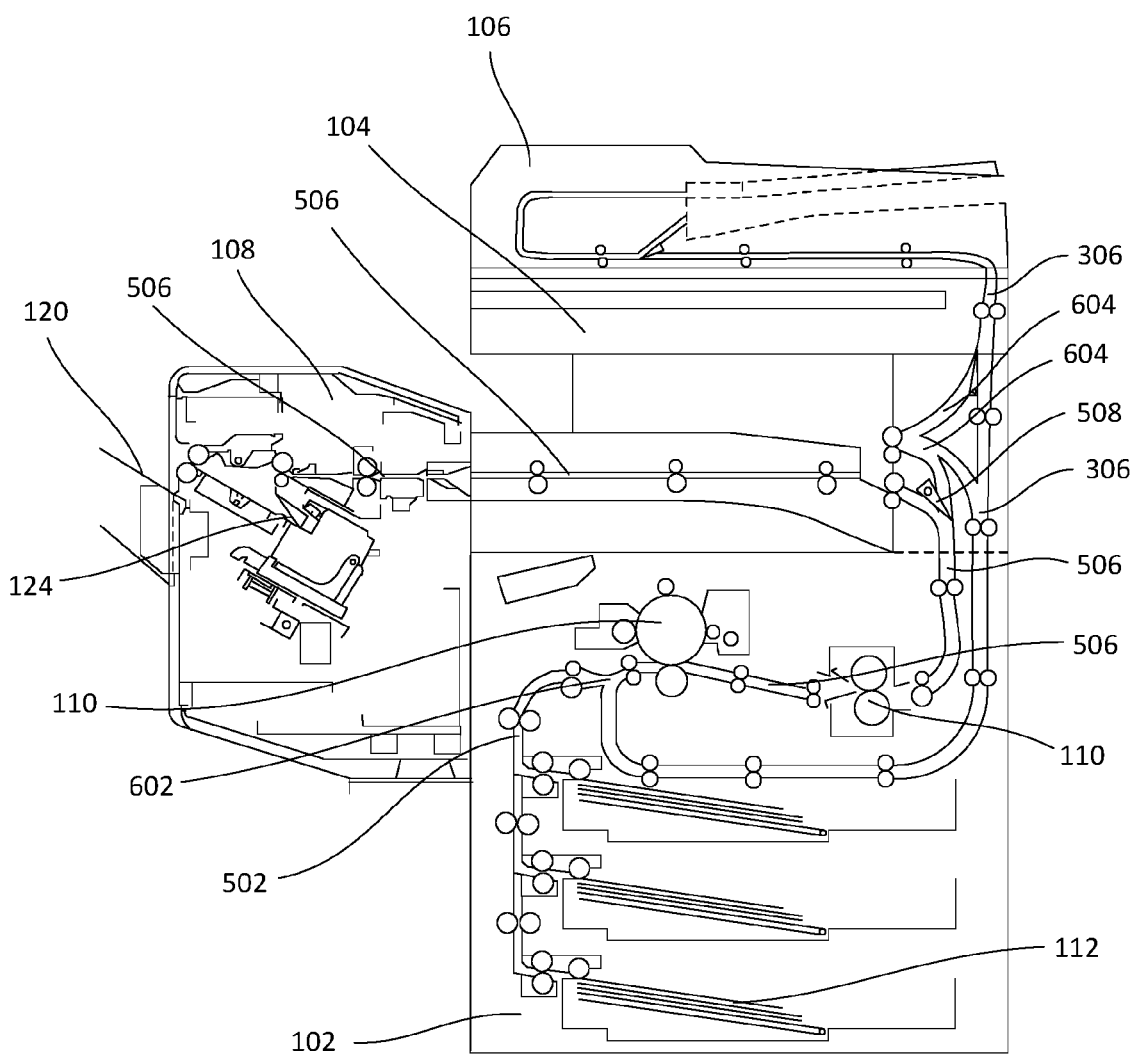
FIGS. 9A-9B depict an alternate embodiment comprising a duplex path that branches off the ADF finisher path and flows into another duplex path that branches off the shared finisher path.
Figure 9B:
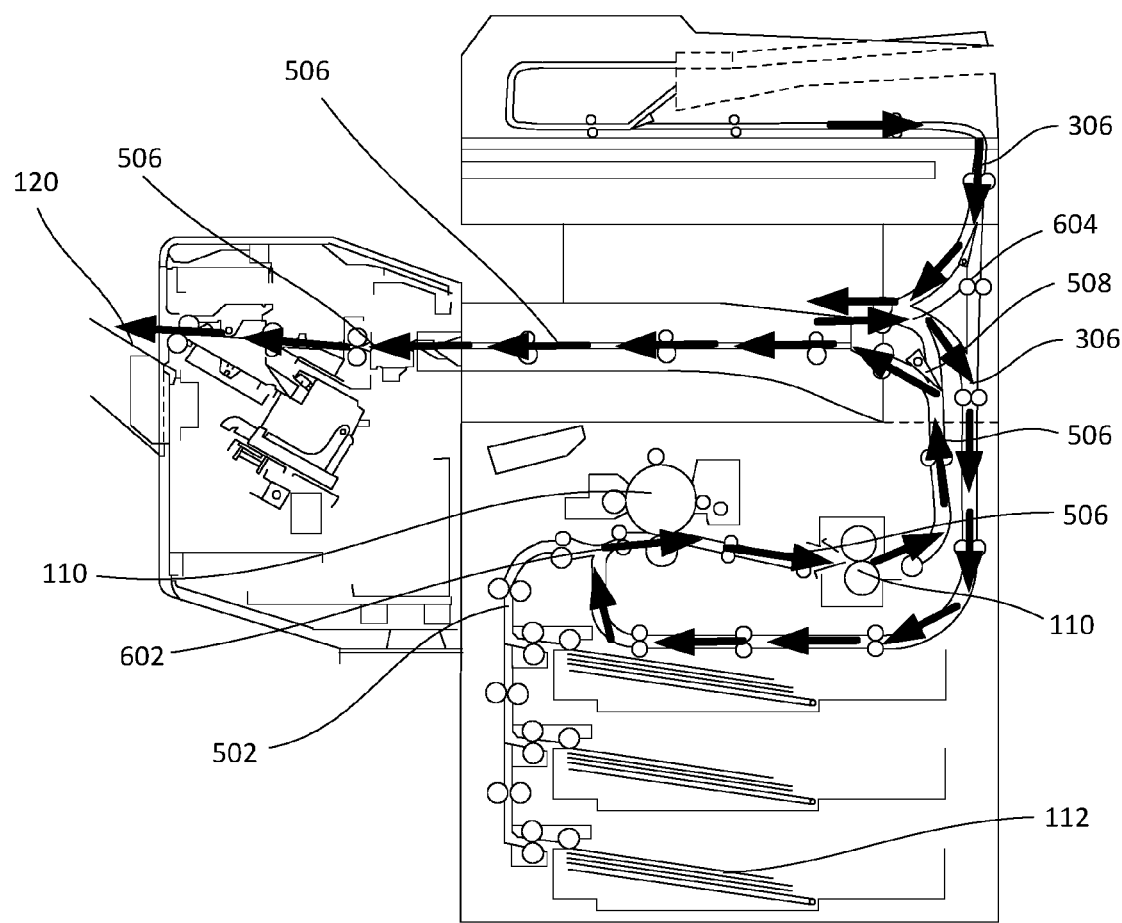

FIGS. 9A-9B depict an alternate embodiment comprising a duplex path 604 that branches off the ADF finisher path 306. In some embodiments, this duplex path 604 can flow into another duplex path 604 that branches off the shared finisher path 506 as shown in FIG. 9A. As shown in FIG. 9B, the duplex path 604 can be configured to selectively pull in pages being conveyed through the ADF finisher path 306, reverse their direction, and re-route then through an alternate path back into the ADF finisher path 306 in a flipped orientation. By way of a non-limiting example, when single-sided pages are scanned at the ADF 106 and pass into the ADF finisher path 306, the duplex path 604 can flip the pages so that the printed side faces the printer components 110 on a first pass through the shared finisher path 506.

Figure 10A:
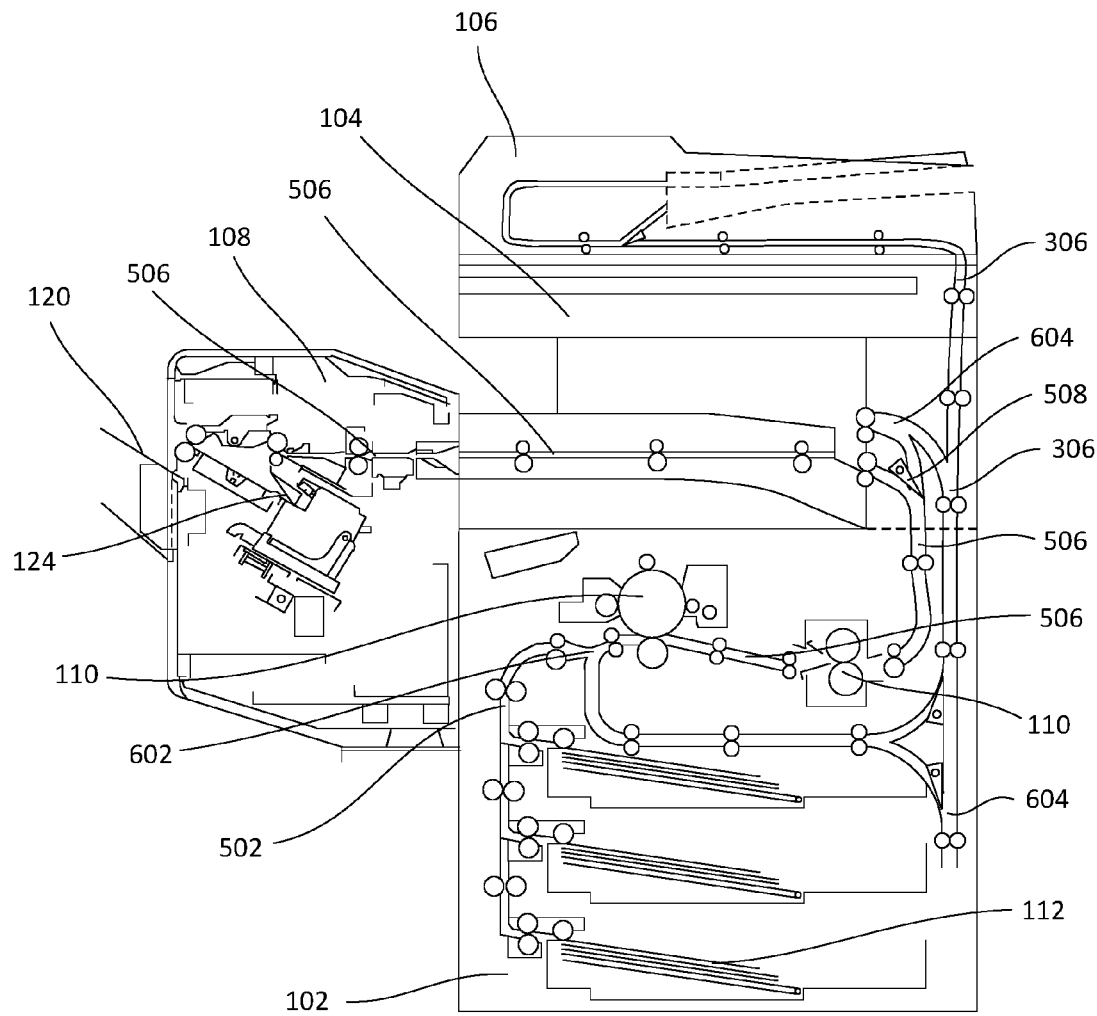
FIGS. 10A-10B depict an alternate embodiment comprising a duplex path that branches off the ADF finisher path.
Figure 10B:
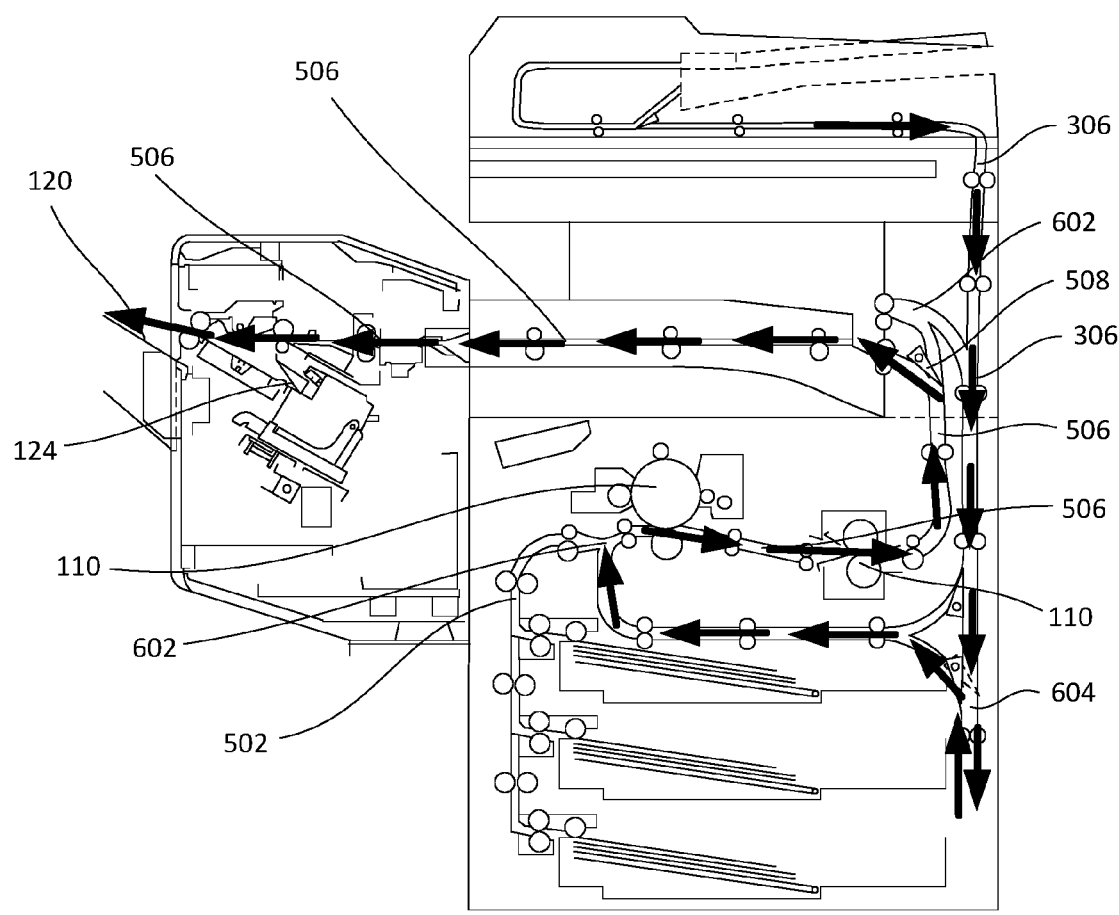

FIGS. 10A-10B depict an alternate embodiment comprising a duplex path 604 that branches off the ADF finisher path 306. In some embodiments this duplex path 604 can be located proximate to paper storage areas 112, as shown in FIG. 10A. In other embodiments it can be located at any other point along the ADF finisher path 306. As shown in FIG. 10B, the duplex path 604 can be configured to selectively pull in pages being conveyed through the ADF finisher path 306, reverse their direction, and re-route then through an alternate path back into the ADF finisher path 306 in a flipped orientation. By way of a non-limiting example, when single-sided pages are scanned at the ADF 106 and pass into the ADF finisher path 306, the duplex path 604 can flip the pages so that the printed side faces the printer components 110 on a first pass through the shared finisher path 506.

Figure 11A:
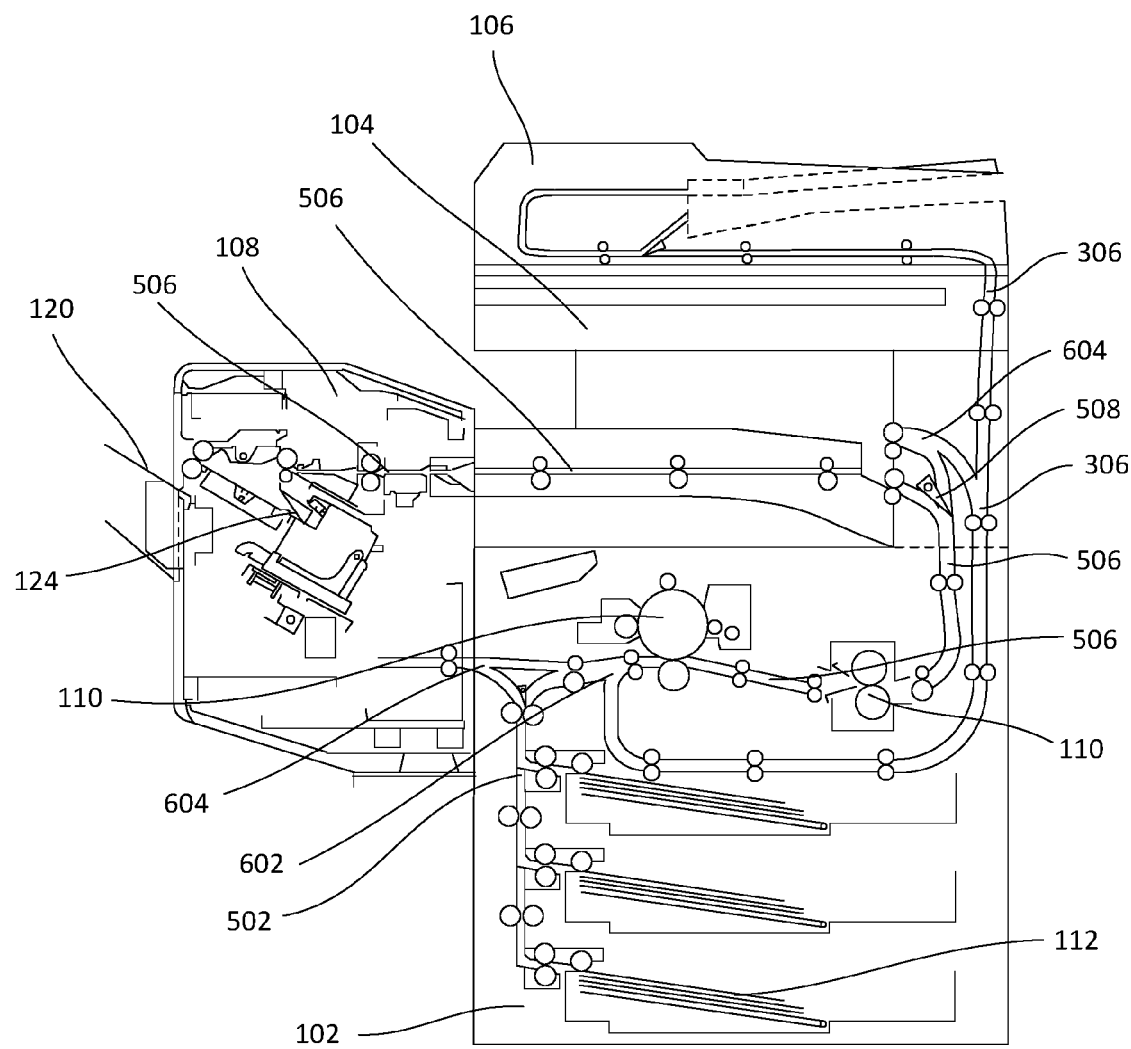
FIGS. 11A-11B depict an alternate embodiment comprising a duplex path that branches off the print path proximate to a pre-print junction.
Figure 11B:
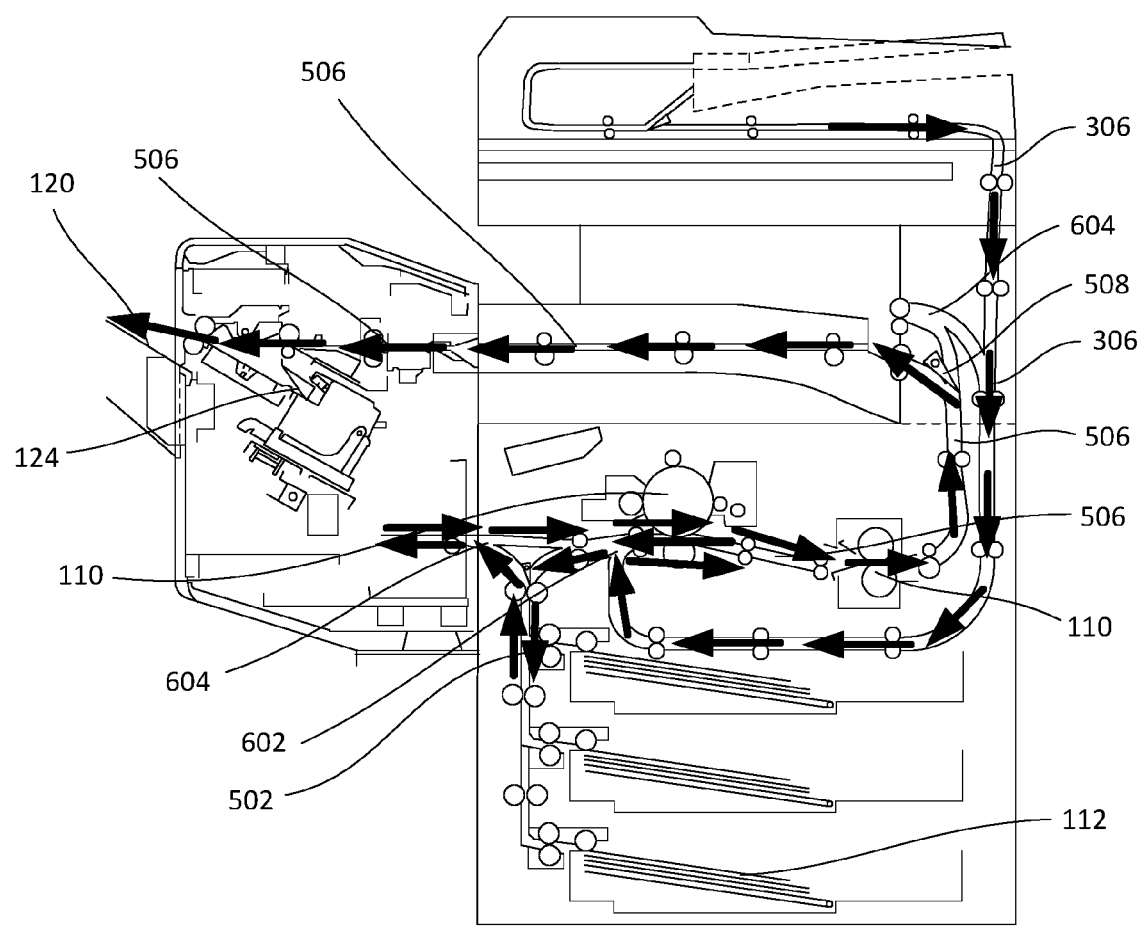

FIGS. 11A-11B depict an alternate embodiment comprising a duplex path 604 that branches off the print path 502 proximate to the pre-print junction 602. In some embodiments, this duplex path 604 can partially enter the finisher 108, while in other embodiments it can be positioned such that it is contained within the printer section 102 and/or scanner section 104. As shown in FIG. 11B, pages from the ADF finisher path 306 can enter the shared finisher path 506 at the pre-print junction 602, then be reversed to flow into the print path 502. The pages can then be reversed again to flow into the duplex path 604. They can then be reversed again within the duplex path 604 and be conveyed to rejoin the shared finisher path 506 in a flipped orientation relative to its first pass into the shared finisher path 506.

Figure 12:
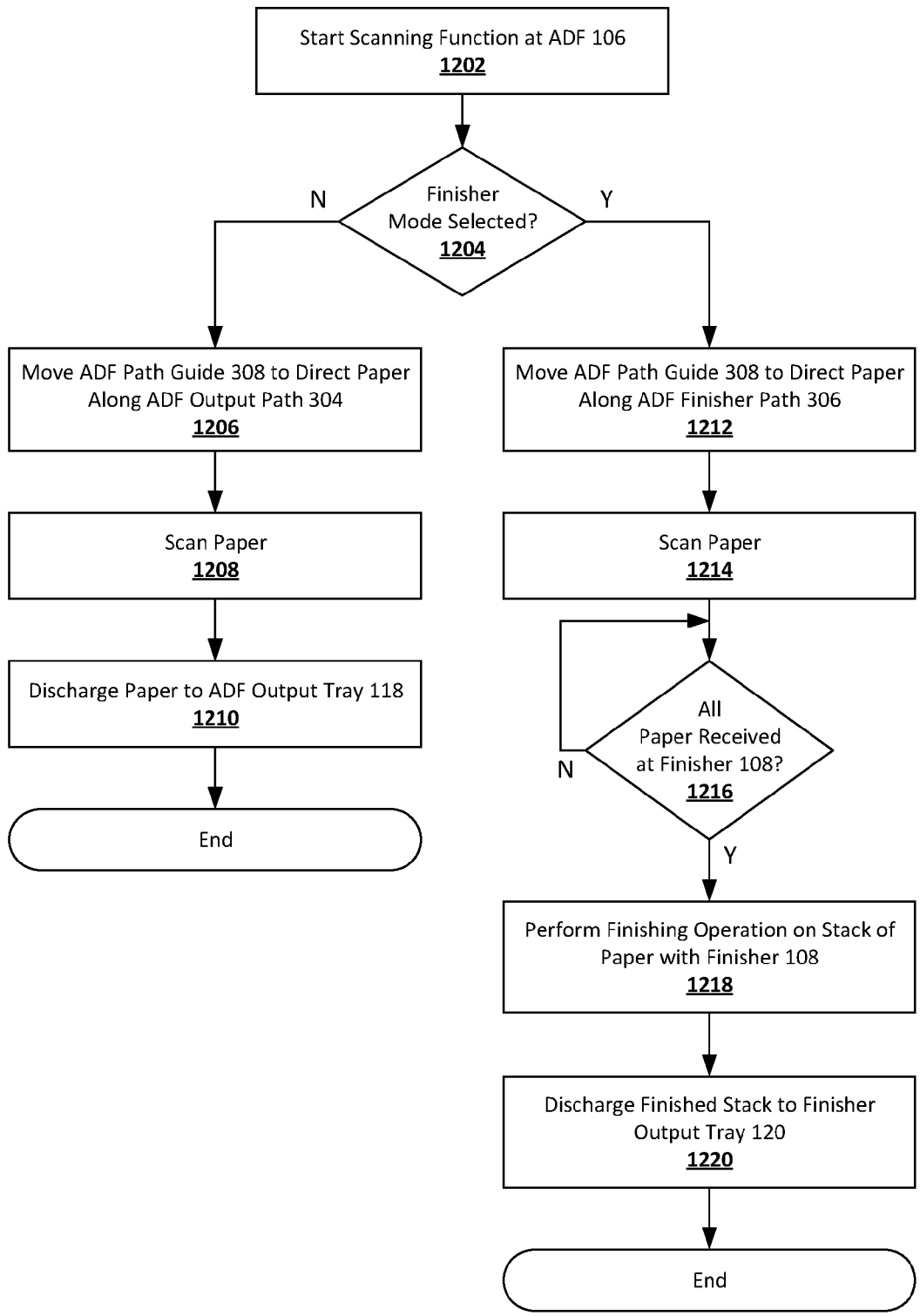
FIG. 12 depicts a flowchart of an exemplary process for directing paper originating at the ADF to either an ADF output tray or a finisher output tray.

FIG. 12 depicts a flowchart of an exemplary process for directing paper originating at the ADF 106 to either the ADF output tray 118 or the finisher output tray 120.

At step 1202, the MFP 100 can receive instructions from a user via the user interface 206 to begin scanning paper from the ADF input tray 116. By way of a non-limiting example, a user can use input/output devices 126 to select a scanning function. The user can also input instructions indicating whether or not they want to scan documents in a finisher mode to perform a finishing operation, such as stapling pages with the finisher's stapler 124. In some embodiments, if a finishing mode is selected that includes stapling, users can also input instructions regarding a specific type of staple to use, specific stapling locations, and/or any other option.

In some embodiments, the MFP's user interface 206 can automatically display options for selecting a scanning function, a finisher mode, and/or stapling options when a sensor at the ADF input tray 116 detects that a stack of paper has been placed in the ADF input tray 116. In other embodiments, options for selecting a finisher mode and/or stapling options can be displayed permanently via the user interface 206 or temporarily when a user activates a scanning function via the user interface 206. In still other embodiments, the ADF input tray 116 can comprise a staple remover and a staple detector, such as an optical sensor. In these embodiments, when a stack of paper is placed in the ADF input tray 116 and the scanning function is activated, the MFP 100 can detect that the input stack is stapled, can remove the original staples with the staple remover, and can automatically select a finisher mode with stapling options such that the original stapled stack of paper is scanned and re-stapled at the finisher 108.

At step 1204, the MFP 100 can determine whether instructions have been received via the user interface 206 indicating that a finishing mode has been selected and that a user has requested a finishing operation. By way of non-limiting examples, a user can select a scanning function with a finishing mode that indicates that the scanned paper should be stapled, bound and/or hole punched.

If at step 1204 the MFP 100 determines that it has not been instructed to staple paper scanned from the ADF input tray 116 or to perform any other finishing operation on scanned paper with the finisher 108, the MFP 100 at step 1206 can move the ADF path guide 308 to a position such that the ADF finisher path 306 is closed off and paper is directed into the ADF output path 304. At step 1208, the MFP 100 can sequentially move sheets of paper from the ADF input tray 116, pass them through the ADF input path 302, and scan them with an image sensor. As the MFP can have closed off the ADF finisher path 306 during step 1206, the scanned paper can be directed into the ADF output path 304 and be discharged to the ADF output tray 118 at step 1210.

However, if at step 1204 the MFP determines that it has been instructed to staple paper scanned from the ADF input tray 116 or perform any other finishing operation on scanned paper with the finisher 108, the MFP 100 at step 1212 can move the ADF path guide 308 to a position such that the ADF output path 304 is closed off and paper is directed into the ADF finisher path 306. At step 1214, the MFP 100 can sequentially move sheets of paper from the ADF input tray 116, pass them through the ADF input path 302, and scan them with an image sensor. As the MFP can have closed off the ADF output path 304 during step 1212, the scanned paper can be directed into the ADF finisher path 306 and be directed through the scanner section 104 and/or printer section 102 into the finisher 108.

At step 1216, the MFP 100 can determine whether a desired number of pages from an input stack of paper loaded at the ADF input tray 106 have reached the finisher 108 through the ADF finisher path 306. If the MFP 100 finds during step 1216 that the expected number of pages have not yet reached the finisher 108, the MFP 100 can wait until the expected number of pages have been received at the finisher 108. Once the MFP 100 determines at step 1216 that all expected pages have been received at the finisher 108, the MFP 100 can move to step 1218.

In some embodiments or situations, the desired number of pages the MFP 100 checks for during step 1216 can be the total number of pages in the stack. By way of a non-limiting example, the ADF 106 can count the number of pages it pulls into the ADF input path 302, and that number can be compared to the number of pages received at the finisher 108 during step 1216. In other embodiments or situations, the desired number of pages the MFP 100 checks for during step 1216 can be a user-input number of pages. By way of a non-limiting example, the user interface 206 can accept instructions indicating that every 10 pages received at the finisher 108 from a stack of 100 pages loaded at the ADF 106 should be stapled together.

At step 1218, the MFP 100 can perform one or more requested finishing operations with the finisher 108, such as stapling the stack of paper at the finisher 108 with the stapler 124. In embodiments in which the MFP 100 received instructions regarding a type of staple to use, a particular location to staple on the pages, and/or other stapling options, the stapler 124 can follow those instructions when stapling the stack of paper. In some embodiments or situations, other finishing options can be performed on the stack of paper before or after stapling, or instead of stapling. By way of non-limiting examples, users can input instructions via the user interface 206 indicating that a stack of scanned paper should be folded, bound, have holes punched, and/or have any other finishing operation performed on it by the finisher 108.

At step 1220, the MFP 100 can discharge the finished stack of paper at the finisher output tray 120 such that it can be removed by a user.

In some embodiments, the MFP 100 can perform image analysis on scanned versions of pages produced by the image sensors to determine whether the original stack of pages was previously finished before being separated and scanned, and can automatically set the finisher 108 to perform finishing operations to recreate the original finishing. By way of a non-limiting example, if the image analysis indicates that an original stack of pages fed into the ADF 106 was folded in a particular way, the MFP 100 can set the finisher 108 to re-fold the pages in that particular way after they have been scanned and reach the finisher 108.

While in some embodiments all users can be permitted to activate a scanning function and/or activate a finishing mode including stapling or other finishing operations, in alternate embodiments some or all MFP 100 operations can be restricted such that only users associated with known and/or authorized user accounts can access or request them.

Although the invention has been described in conjunction with specific embodiments thereof, it is evident that many alternatives, modifications and variations will be apparent to those skilled in the art. Accordingly, the invention as described and hereinafter claimed is intended to embrace all such alternatives, modifications and variations that fall within the spirit and broad scope of the appended claims.

What is claimed is:

1. A multifunctional printer, comprising:
   a printer section comprising one or more printer components and a paper storage area;
   an auto-document feeder comprising an input tray and an input path configured to draw paper from the input tray into the input path;
   a scanner section comprising one or more image sensors configured to scan paper moving through the input path in the auto-document feeder; and
   a finisher comprising a finisher output tray,
   wherein the input path in the auto-document feeder branches into an output path that leads to an output tray at the auto-document feeder and a finisher path that leads through the auto-document feeder, the scanner section, and the printer section
   wherein the finisher path is configured to convey paper that has been conveyed through an image-reading position of the one or more image sensors,
   wherein the auto-document feeder comprises a path guide configured to selectively close off either the output path or the finisher path, and
   wherein the finisher path and a print path converge into a shared finisher path that leads through the printer section to the finisher such that the finisher is configured to perform a finishing operation on a stack of paper received through the shared finisher path and output a finished stack of paper at the finisher output tray.

2. The multifunctional printer of claim 1, further comprising a plurality of rollers configured to convey sheets of paper through the input path, the output path, the finisher path, the print path, and the shared finisher path.

3. The multifunctional printer of claim 1, wherein the finisher path and the print path converge at a post-print junction wherein paper conveyed through the input path and the finisher path enters the shared finisher path without passing through the printer components.

4. The multifunctional printer of claim 1, wherein the finisher path and the print path converge at a pre-print junction wherein paper conveyed through the input path and the finisher path enters the shared finisher path before passing through the printer components.

5. The multifunctional printer of claim 4, wherein the shared finisher path selectively branches off into a duplex path configured to reverse paper entering the duplex path and convey it through the finisher path such that the paper passes through the printer components a second time with an opposite face toward the printer components relative to a first time that the paper passed through the printer components.

6. The multifunctional printer of claim 1, wherein the auto-document feeder is mounted on a hinged lid that can be tilted against or away from the scanner section.

7. The multifunctional printer of claim 6, wherein a lower surface of the auto-document feeder and an upper surface of the scanner section define paper path cutouts through which paper in the finisher path exits the auto-document feeder and enters the scanner section when the lid is tilted against the scanner section.

8. The multifunctional printer of claim 7, wherein the paper path cutout in the scanner section is tapered.

9. The multifunctional printer of claim 1, wherein the finisher comprises a stapler and the finishing operation is stapling the stack of paper with the stapler.

10. A method of selectively outputting scanned pages at a finisher, comprising:
- accepting instructions through a user interface at a multifunctional printer to scan pages loaded at an input tray of an auto-document feeder;
- sequentially drawing in pages from the input tray into an input path of the auto-document feeder and scanning the pages with an image sensor in a scanner section of the multifunctional printer;
- selectively moving a path guide in the auto-document feeder to close an output path branching from the input path to an output tray at the auto-document feeder and correspondingly open a finisher path branching from the input path when the instructions indicate that a finisher mode has been selected, wherein the finisher path leads through the scanner section and a printer section of the multifunctional printer and converges with a print path into a shared finisher path terminating at the finisher, such that the pages from the auto-document feeder's input tray and that have been conveyed through an image-reading position of the image sensor are conveyed through the finisher path and the shared finisher path to the finisher;
- performing a finishing operation on a stack of pages received at the finisher through the shared finisher path with the finisher; and
- outputting the stack of pages at a finisher output tray.

11. The method of claim 10, wherein the finisher path converges with the print path at a post-print junction such that paper entering the shared finisher path from the finisher path is not routed through printer components.

12. The method of claim 10, wherein the finisher path converges with the print path at a pre-print junction such that paper entering the shared finisher path from the finisher path is routed through printer components.

13. The method of claim 12, further comprising printing information on paper that entered the shared finisher path from the finisher path with the printer components.

14. The method of claim 12, further comprising selectively branching the shared finisher path into a duplex path, reversing paper that enters the duplex path and routing it into the finisher path, and conveying the paper through the finisher path such that it re-enters the shared finisher path and passes through the printer components a second time, wherein the paper's second time through the printer components is in a flipped orientation relative to a first time that the paper passed through the printer components.

15. The method of claim 14, further comprising printing information on a first side of the paper with the printer components during the paper's first time through the printer components and printing information on an opposing second side of the paper with the printer components during the paper's second time through the printer components.

16. The method of claim 10, wherein the finisher comprises a stapler and the finishing operation is stapling the stack of paper.

17. The method of claim 16, wherein the instructions indicate a number of pages to staple, and the stapling is performed after that number of pages reaches the finisher.

18. The method of claim 16, wherein the instructions indicate a type of staple to be used by the stapler, and the stapling is performed with the indicated type of staple.

19. The method of claim 16, further comprising, when the auto-document feeder determines that pages loaded at the input tray are stapled with staples, removing the staples from the pages with a staple remover at the input tray and automatically setting a finisher mode including stapling options.

\* \* \* \* \*